United States Patent
Bhat et al.

(10) Patent No.: US 12,218,520 B2
(45) Date of Patent: Feb. 4, 2025

(54) WIRELESS POWER TRANSCEIVER DEVICE AND AN ASSOCIATED METHOD THEREOF

(71) Applicant: GE Intellectual Property Licensing, LLC, Niskayuna, NY (US)

(72) Inventors: Suma Memana Narayana Bhat, Bangalore (IN); Somakumar Ramachandrapanicker, Bangalore (IN); Arun Kumar Raghunathan, Bangalore (IN); Viswanathan Kanakasabai, Bangalore (IN); Deepak Aravind, Bangalore (IN)

(73) Assignee: Dolby Laboratories Inc., San Francisco, CA (US)

( * ) Notice: Subject to any disclaimer, the term of this patent is extended or adjusted under 35 U.S.C. 154(b) by 109 days.

(21) Appl. No.: 16/604,593

(22) PCT Filed: Mar. 16, 2018

(86) PCT No.: PCT/US2018/022847
§ 371 (c)(1),
(2) Date: Oct. 11, 2019

(87) PCT Pub. No.: WO2018/190985
PCT Pub. Date: Oct. 18, 2018

(65) Prior Publication Data
US 2020/0274390 A1    Aug. 27, 2020

(30) Foreign Application Priority Data

Apr. 14, 2017    (IN) .............................. 201741013384

(51) Int. Cl.
*H02J 50/40*    (2016.01)
*H02J 3/02*    (2006.01)
*H02J 50/10*    (2016.01)

(52) U.S. Cl.
CPC ................ *H02J 50/40* (2016.02); *H02J 3/02* (2013.01); *H02J 50/10* (2016.02)

(58) Field of Classification Search
CPC ............... H02J 50/10; H02J 50/40; H02J 3/02
See application file for complete search history.

(56) References Cited

U.S. PATENT DOCUMENTS 8,933,583 B2 *    1/2015 Uchida ................... H02J 50/12
                                                                  307/11
9,656,563 B2 *    5/2017 Ishigaki .................. B60L 53/12
(Continued)

FOREIGN PATENT DOCUMENTS

JP            2015057936 A         3/2015
KR       1020140121200 A       10/2014
(Continued)

OTHER PUBLICATIONS

"India Application No. 201741013384 Examination Report", Apr. 12, 2019, 6 pages.

(Continued)

*Primary Examiner* — Daniel Kessie
*Assistant Examiner* — Brian K Baxter
(74) *Attorney, Agent, or Firm* — DeLizio, Peacock, Lewin & Guerra, LLP (57) ABSTRACT

A wireless power transceiver (WPT) device is disclosed. The WPT device includes an energy module and a magnetic interfacing unit comprising a transceiver coil. Further, the WPT device includes a controller configured to generate one of a first control signal and a second control signal based on at least one first parameter of the energy module and at least one second parameter of one of a plurality of external devices. Also, the WPT device includes a bi-directional driver configured to transmit at least one of a first AC signal and a second AC signal through the transceiver coil if the (Continued)

first control signal is received from the controller, and receive at least one of the first AC signal and the second AC signal if the second control signal is received from the controller.

20 Claims, 3 Drawing Sheets

(56) References Cited

U.S. PATENT DOCUMENTS

| | | | | |
|---|---|---|---|---|
| 9,837,203 | B2* | 12/2017 | Singh | H02J 50/60 |
| 9,876,381 | B2 | 1/2018 | Wang et al. | |
| 9,906,067 | B1* | 2/2018 | Garrity | H02J 7/02 |
| | | | | 320/108 |
| 10,141,756 | B1* | 11/2018 | Venkatasamy | H02J 7/007182 |
| 2011/0018356 | A1 | 1/2011 | Chatterjee | |
| 2011/0051308 | A1* | 3/2011 | Chan | H01F 21/12 |
| | | | | 361/268 |
| 2011/0215757 | A1* | 9/2011 | Tsai | H02J 7/00 |
| | | | | 320/108 |
| 2013/0015705 | A1* | 1/2013 | Abe | H02J 50/90 |
| | | | | 307/29 |
| 2013/0134923 | A1* | 5/2013 | Smith | H02J 7/02 |
| | | | | 320/103 |
| 2014/0001874 | A1* | 1/2014 | Nahidipour | H02J 50/80 |
| | | | | 307/104 |
| 2014/0103711 | A1* | 4/2014 | Ichikawa | H02J 7/00034 |
| | | | | 307/104 |
| 2014/0312848 | A1* | 10/2014 | Alexander | H02J 7/007192 |
| | | | | 320/134 |
| 2015/0115881 | A1* | 4/2015 | Park | H02J 7/02 |
| | | | | 320/108 |
| 2015/0244176 | A1* | 8/2015 | Van Den Brink | H02J 50/80 |
| | | | | 307/104 |
| 2015/0349572 | A1* | 12/2015 | McCoy | H02J 7/342 |
| | | | | 320/103 |
| 2017/0133889 | A1* | 5/2017 | Yeo | H02J 50/12 |
| 2018/0041065 | A1* | 2/2018 | Vijayan | H02M 7/53871 |
| 2018/0041066 | A1* | 2/2018 | Vijayan | H02J 50/402 |
| 2018/0331581 | A1* | 11/2018 | Hosseini | H02J 7/025 |
| 2019/0199129 | A1* | 6/2019 | Kobayashi | H02S 50/00 |
| 2019/0326769 | A1* | 10/2019 | Kanakasabai | H02J 7/00 |
| 2020/0083753 | A1* | 3/2020 | Bhat | H01F 38/14 |
| 2020/0153277 | A1* | 5/2020 | Mohan | H02J 50/40 |
| 2020/0153283 | A1* | 5/2020 | Kanakasabai | H02J 50/90 |
| 2020/0176990 | A1* | 6/2020 | Bhat | H02J 50/70 |
| 2020/0244174 | A1* | 7/2020 | Kanakasabai | H02M 3/33573 |
| 2020/0328622 | A1* | 10/2020 | Abu Qahouq | H01F 38/14 |
| 2022/0158497 | A1* | 5/2022 | Babakhani | H02J 50/27 |

FOREIGN PATENT DOCUMENTS

| | | |
|---|---|---|
| KR | 1020160022179 A | 2/2016 |
| KR | 102017008438 A | 1/2017 |
| KR | 1020170016147 A | 2/2017 |

OTHER PUBLICATIONS

"China patent application No. 201880024670.3 First Office Action", Jan. 28, 2023, 9 pages.
"China patent application No. 201880024670 Decision of Rejection", Sep. 4, 2023, 5 pages.
"China patent application No. 201880024670.3 3rd Office Action", Mar. 13, 2024.
"China patent application No. 201880024670.3 Second Office Action", Dec. 25, 2023, 14 pages.

* cited by examiner

WIRELESS POWER TRANSCEIVER DEVICE AND AN ASSOCIATED METHOD THEREOF

BACKGROUND

Embodiments of the present invention relate generally to wireless power systems and more particularly to wireless power transceiver device and an associated method thereof.

In general, power transfer systems are used to transfer power from a power source to one or more receiver devices, such as for example, mobile devices, biomedical devices, portable consumer devices, or the like. The power transfer systems may be contact based power transfer systems or wireless power transfer systems. In the contact based power transfer systems, interconnecting wires are used to transfer electric power from a power source to receiver devices. The interconnecting wires may be affected over a period of time. Further, interconnecting wires of a contact based power transfer system add to the overall weight of the system. Consequently, the contact based power transfer systems are typically bulkier and heavier compared to wireless based power transfer systems.

Typically, in a wireless power transfer system, a charging device is used to convert an input power received from a power source to a transferable power that is transmitted to charge one or more batteries in a receiver device. If the power source is an external source, the charging device needs to be coupled to the power source via one or more interconnecting wires, which in turn ceases the mobility of the charging device. If the power source is an internal source, such as a battery, the charging device may supply limited power till the battery is drained. The drained battery needs to be replaced for further transmission of power to the receiver device.

Therefore, there is a need for an improved system and method for transmitting and receiving wireless power from external devices.

BRIEF DESCRIPTION

In accordance with one embodiment of the present invention, a wireless power transceiver device is disclosed. The wireless power transceiver device includes an energy module. Further, the wireless power transceiver device includes a magnetic interfacing unit including at least one transceiver coil. Also, the wireless power transceiver device includes a controller coupled to the magnetic interfacing unit, and configured to generate one of a first control signal and a second control signal based on at least one first parameter of the energy module and at least one second parameter of one of a plurality of external devices. In addition, the wireless power transceiver device includes a bi-directional driver coupled to the magnetic interfacing unit and the controller, and configured to transmit at least one of a first AC signal having a first frequency and a second AC signal having a second frequency different from the first frequency through the at least one transceiver coil if the first control signal is received from the controller, and receive at least one of the first AC signal having the first frequency and the second AC signal having the second frequency through the at least one transceiver coil if the second control signal is received from the controller.

In accordance with another embodiment of the present invention, a method for transmitting and receiving a power is disclosed. The method includes generating, by a controller, one of a first control signal and a second control signal based on at least one first parameter of an energy module and at least one second parameter of one of a plurality of external devices. Also, the method includes transmitting, by a bi-directional driver, at least one of a first AC signal having a first frequency and a second AC signal having a second frequency different from the first frequency through at least one transceiver coil if the first control signal is received from the controller. Further, the method includes receiving, by the bi-directional driver, at least one of the first AC signal having the first frequency and the second AC signal having the second frequency through the at least one transceiver coil if the second control signal is received from the controller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for transmitting and receiving wireless power are disclosed. In particular, the system and method disclosed herein allow devices, such as power banks or mobile devices to receive power from other devices or transfer the power wirelessly to charge other devices independent of wireless charging standard.

Figure 1:
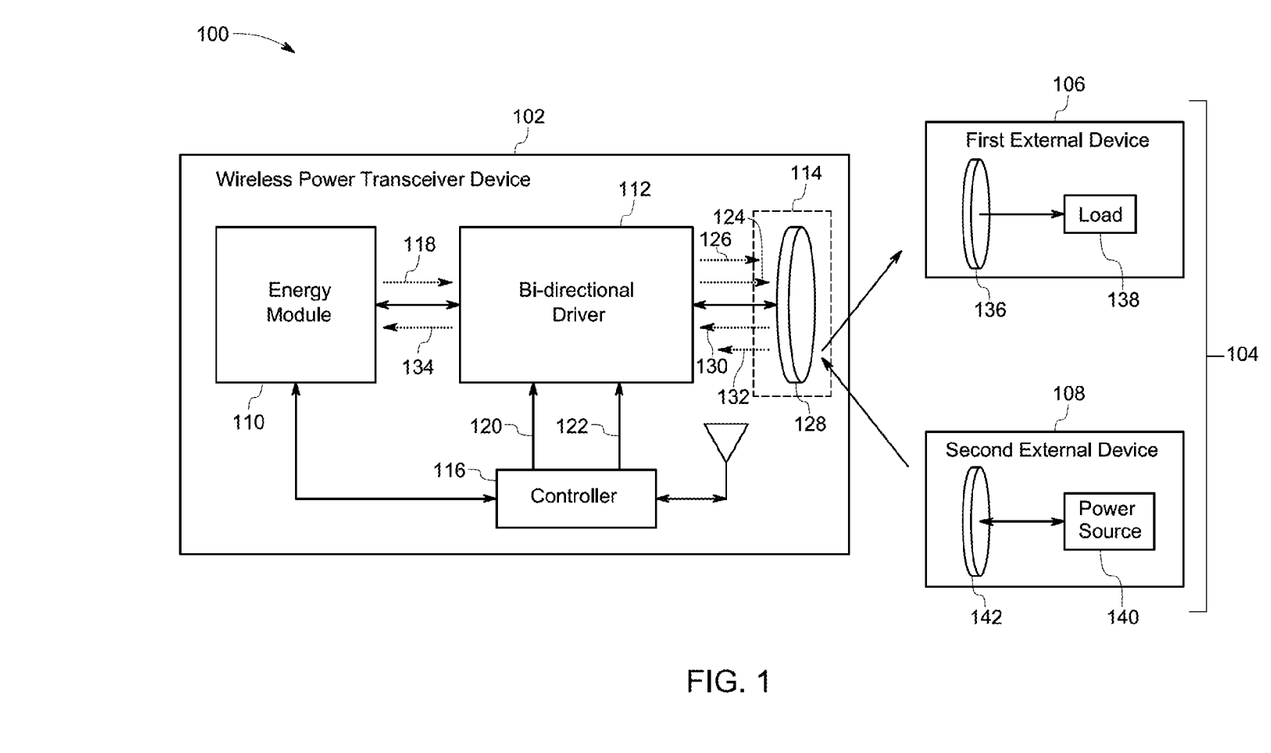
FIG. 1 a diagrammatical representation of a wireless power transfer system in accordance with embodiments of the present invention.

FIG. 1 is a diagrammatical representation of a wireless power transfer system 100 in accordance with an embodiment of the present invention. The wireless power transfer system 100 includes a wireless power transceiver device 102 and external devices 104 including a first external device 106 and a second external device 108. For ease of understanding, the first external device 106 is considered as a power receiving device, such as a mobile device, a biomedical device, a portable consumer device, or the like. Similarly, the second external device 108 is considered as a power transmitting device, such as a power bank, a charging pad, or the like. The number of external devices may vary depending on the application.

The first and second external devices 106, 108 are compatible with one of the wireless frequency standards. In the illustrated embodiment of the invention, the first external device 106 is considered to be compatible with a first frequency standard such as Air Fuel Alliance standard defined at a frequency of about 6.7 MHz. Similarly, the second external device 108 is considered to be compatible with a second frequency standard such as Qi standard defined in a frequency range of 100 kHz to 200 kHz. It should be noted herein that the first and second external devices 106, 108 may be compatible with any frequency standard and are not limited to the frequency standards mentioned herein. Further, the use of any number of external devices 104 that are compatible with any number of frequency standards may be envisioned.

In conventional power transfer systems, a charging device is used to transmit electric power to a mobile device. However, the charging device is coupled to an external power source via one or more interconnecting wires, which in turn restricts the mobility of the charging device. On the other hand, if a battery is included in the charging device to transmit the power, the charging device may supply limited power till the battery is drained. Also, the drained battery needs to be recharged using interconnecting wires for further transmission of electric power to the mobile device.

To overcome the problems/drawbacks associated with conventional systems, the exemplary power transfer system 100 includes the wireless power transceiver device 102 that is configured to transmit electric power to the first external device 106 or receive the electric power from the second external device 108. In one embodiment, the first and second external devices 106, 108 may be positioned at a predetermined distance from the wireless power transceiver device 102. For example, the predetermined distance may be in a range from about 5 mm to 500 mm. The wireless power transceiver device 102 is configured to transmit the electric power to the first external device 106 or receive electric power at the corresponding frequency standard.

As depicted in FIG. 1, the wireless power transceiver device 102 includes an energy module 110, a bi-directional driver 112, a magnetic interfacing unit 114, and a controller 116. The bi-directional driver 112 is electrically coupled to the energy module 110, the magnetic interfacing unit 114, and the controller 116. In one embodiment, the energy module 110 is configured to supply input electric power having a direct current (DC) signal 118 to the bi-directional driver 112. In another embodiment, the energy module 110 is configured to receive electric power having a DC signal 134 from the bi-directional driver 112. The energy module 110 may be a storage unit, such as a battery that is capable of transmitting and receiving the electric power. In some embodiments, the transmitted or received electric power may be in a range from about 0.1 W to 3 KW.

Further, the controller 116 is operatively coupled to the energy module 110 and the first and second external devices 106, 108. The controller 116 is configured to receive one or more parameters from one of the first and second external devices 106, 108 and one or more parameters from the energy module 110. In response, the controller 116 is configured to generate a first control signal 120 or the second control signal 122 based on the parameters received from the energy module 110 and one of the first and second external devices 106, 108. In one embodiment, the parameters may include state of charge, voltage, power, frequency band type or the like. The frequency band type may be one of the frequency standards, such as Air Fuel Alliance standard and Qi standard.

Further, the bi-directional driver 112 is configured to receive the first control signal 120 or the second control signal 122 from the controller 116. If the first control signal 120 is received, the bi-directional driver 112 receives the input electric power having the DC signal 118 from the energy module 110 and converts the DC signal 118 to a first AC signal 124 having a first frequency or a second AC signal 126 having a second frequency. It may be noted that the first frequency corresponds to the first frequency standard and the second frequency corresponds to the second frequency standard. Further, the bi-directional driver 112 transmits the first AC signal 124 having the first frequency or the second AC signal 126 having the second frequency to the first external device 106 via a transceiver coil 128 disposed in the magnetic interfacing unit 114. The transmitted first AC signal 124 or the second AC signal 126 are received by a receiver coil 136 for charging a load 138, such as one or more batteries within the first external device 106. In another embodiment, if the first external device 106 is compatible with both first and second frequency standards, the bi-directional driver 112 may convert the DC signal 118 to the first AC signal 124 having the first frequency and the second AC signal 126 having the second frequency. Further, the bi-directional driver 112 may transmit the first AC signal 124 having the first frequency and the second AC signal 126 having the second frequency to the first external device 106 via a transceiver coil 128. In one example, the bi-directional driver 112 may alternately transmit the first AC signal 124 having the first frequency and the second AC signal 126 having the second frequency.

If the second control signal 122 is received, the bi-directional driver 112 receives a first AC signal 130 having the first frequency or a second AC signal 132 having the second frequency from the second external device 108 via the transceiver coil 128 within the magnetic interfacing unit 114. Particularly, a power source 140 within the second external device 108 generates a DC signal that is converted to the first AC signal 130 or the second AC signal 132 which are then transmitted to the bi-directional driver 112, via a transmitter coil 142 within the second external device 108. Further, the bi-directional driver 112 converts the first AC signal 130 having the first frequency or the second AC signal 132 having the second frequency to the DC signal 134 that is used for charging the energy module 110. In another embodiment, if the second external device 108 is compatible with both first and second frequency standards, the bi-directional driver 112 may receive the first AC signal 130 having the first frequency and the second AC signal 132 having the second frequency from the second external device 108. Further, the bi-directional driver 112 may convert the first AC signal 130 having the first frequency and the second AC signal 132 having the second frequency to the DC signal 134 that is used for charging the energy module 110. The aspect of transmitting and receiving the power is explained in greater detail with reference to FIG. 2.

Thus, by employing the exemplary wireless power transceiver device 102, the power may be wirelessly transmitted to the first external device 106 for charging a battery in the first external device 106. Also, the wireless power transceiver device 102 may wirelessly receive the power from the second external device 108 for charging the energy module 110 in the wireless power transceiver device 102. Moreover, the exemplary wireless power transceiver device 102 may be a mobile charger that can transmit electric power without any interconnecting wires to the first external device 106 or receive electric power from the second external device 108.

Figure 2:
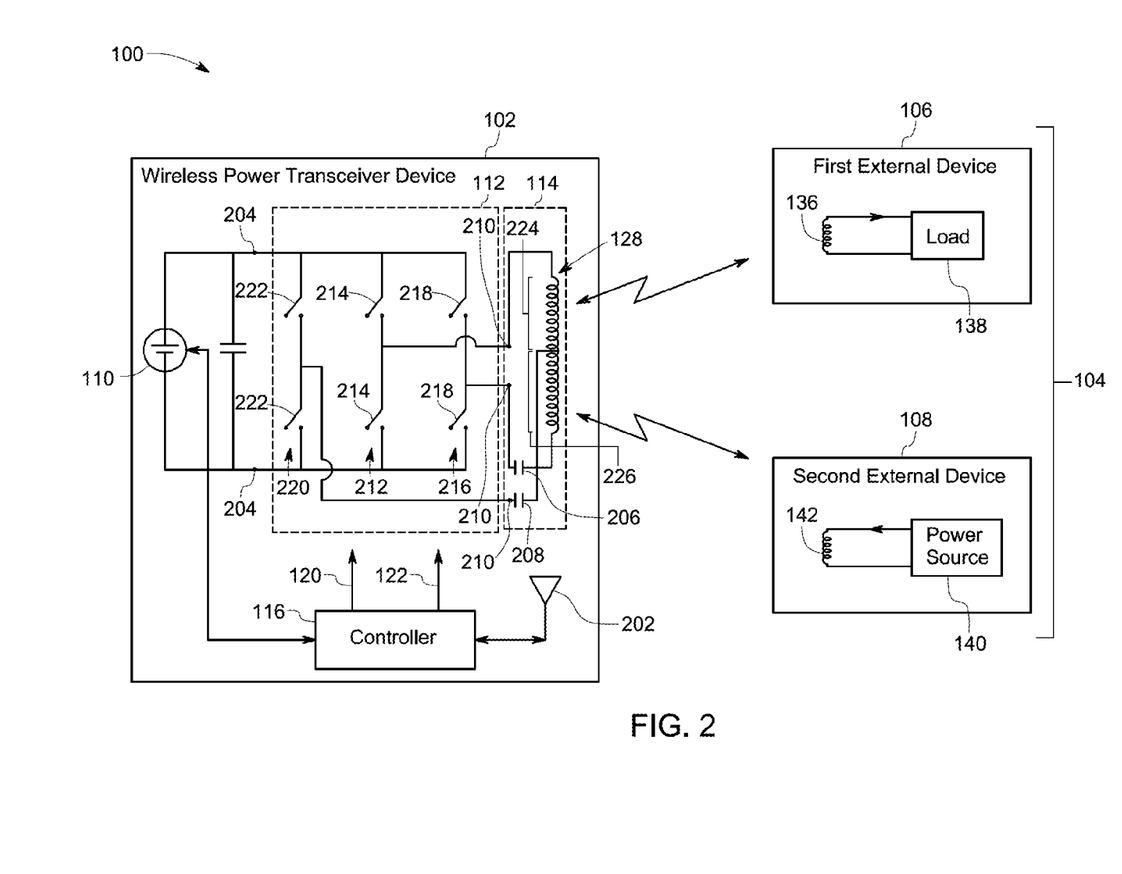
FIG. 2 is a detailed schematic representation of the wireless power transfer system in accordance with embodiments of the present invention.

Referring to FIG. 2, a schematic representation of the wireless power transfer system 100 in accordance with embodiments of the present invention is depicted. The wireless power transfer system 100 includes the wireless power transceiver device 102, the first external device 106, and the second external device 108. The wireless power transceiver device 102 is magnetically coupled to the first external device 106 and the second external device 108.

Further, the wireless power transceiver device 102 includes the energy module 110, the bi-directional driver 112, the magnetic interfacing unit 114, the controller 116, and an antenna 202. The energy module 110 may be a DC source that is electrically coupled to first terminals 204 of the bi-directional driver 112. In one embodiment, the energy module 110 is used to supply input electric power having the DC signal to the first terminals 204 of the bi-directional driver 112. The DC signal may be representative of a DC voltage of the input power from the energy module 110. In another embodiment, the energy module 110 is used to receive electric power having DC signal from the first terminals 204 of the bi-directional driver 112. Further, the magnetic interfacing unit 114 includes the transceiver coil 128 and capacitors 206, 208 that are electrically coupled to second terminals 210 of the bi-directional driver 112.

Further, the bi-directional driver 112 includes a first leg 212 of switches 214, a second leg 216 of switches 218 that are connected to form a bridge circuit between the first terminals 204 and the second terminals 210. In addition, the bi-directional driver 112 includes a third leg 220 of switches 222 that is coupled in parallel to the first leg 212 of switches 214 and the second leg 216 of switches 218. The third leg 220 of switches 222 are used for tapping the transceiver coil 128 at a desired or predefined location to vary a number of turns of the transceiver coil 128. More particularly, if the third leg 220 of switches 222 is activated along with the first leg 212 of switches 214, a first number of turns 224 of the transceiver coil 128 is activated. In one embodiment, the first number of turns 224 of the transceiver coil 128 is activated to transmit the electric power to the first external device 106. Similarly, if the third leg 220 of switches 222 is activated along with the second leg 216 of switches 218, a second number of turns 226 of the transceiver coil 128 is activated. In one embodiment, the second number of turns 226 of the transceiver coil 128 is activated to receive the electric power from the second external device 108.

During operation, the controller 116 receives one or more parameters (also referred to as first parameters) from the energy module 110. The one or more first parameters may include state of charge (also referred to as first state of charge) of the energy module 110, power of the energy module 110, voltage of the energy module 110, and frequency band type of the wireless power transceiver device 102. In one embodiment, the state of charge may be determined based on power or voltage of the energy module 110. It may be noted that the state of charge is indicative of a percentage of charge in the energy module 110. In another embodiment, the frequency band type may be one of the frequency standards discussed herein.

Further, the controller 116 receives one or more parameters (also referred to as second parameters) from the first external device 106 or the second external device 108. The controller 116 is coupled to the antenna 202 that is wirelessly coupled to the first and second external devices 106, 108 to receive the one or more second parameters. In one embodiment, short range communication, such as Bluetooth communication may be established between the controller 116 and the first and second external devices 106, 108 for communicating the first and second parameters. The one or more second parameters may include state of charge (also referred to as second state of charge) of the first and second external devices 106, 108, power of the first and second external devices 106, 108, voltage of the first and second external devices 106, 108, and frequency band type of the first and second external devices 106, 108.

Further, the controller 116 is configured to generate the first control signal 120 or the second control signal 122 based on the one or more first parameters received from the energy module 110 and the one or more second parameters of the external devices 104. In one embodiment, if the controller 116 receives the one or more second parameters from the first external device 106, the controller 116 determines the state of charge of the first external device 106. Further, the controller 116 compares the state of charge of the first external device 106 with the state of charge of the energy module 110. If the state of charge of the first external device 106 is less than the state of charge of the energy module 110, the controller 116 generates the first control signal 120. The generated first control signal 120 is transmitted to the bi-directional driver 112 to activate the first leg 212 of the switches 214 and the third leg 220 of the switches 222 in the bi-directional driver 112. As a result, the first number of turns 224 of the transceiver coil 128 is activated or turned ON to transmit the input electric power to the first external device 106. More specifically, in addition to the first control signal 120, the controller 116 transmits one or more frequency control signals to the first leg 212 of switches 214 and the third leg 220 of switches 222 to convert the DC signal to the first AC signal 124 having the first frequency or the second AC signal 126 having the second frequency. In one embodiment, the frequency control signals may be pulse modulated signals having a predetermined duty cycle. The converted first AC signal 124 or the second AC signal 126 are transmitted to the first external device 106 via the first number of turns 224 of the transceiver coil 128.

Furthermore, the first AC signal 124 having the first frequency or the second AC signal 126 having the second frequency are transmitted to the first external device 106 until the charge in the first external device 106 is greater than a threshold charge value. In particular, the first external device 106 transmits the one or more second parameters that indicate the state of charge of the first external device 106 continuously or periodically to the controller 116 in the wireless power transceiver device 102. Further, the controller 116 drives the bi-directional driver 112 to stop the transmission of the first AC signal 124 or the second AC signal 126 to the first external device 106 if the charge in the first external device 106 is greater than the threshold charge value. In one embodiment, the controller 116 sends control signals to deactivate the first leg 212 of the switches 214 and the third leg 220 of switches 222. In another embodiment, if the first external device 106 is compatible with both first and second frequency standards, the bi-directional driver 112 may convert the DC signal 118 to the first AC signal 124 having the first frequency and the second AC signal 126 having the second frequency. Further, the bi-directional driver 112 may transmit the first AC signal 124 having the first frequency and the second AC signal 126 having the second frequency to the first external device 106 via a transceiver coil 128. In one example, the bi-directional driver 112 may alternately transmit the first AC signal 124 having the first frequency and the second AC signal 126 having the second frequency.

In another embodiment, if the controller 116 receives the one or more second parameters from the second external device 108, the controller 116 determines a state of charge of the second external device 108 based on the one or more second parameters received from the second external device 108. Further, the controller 116 compares the state of charge of the second external device 108 with the state of charge of the energy module 110. If the state of charge of the second external device 108 is greater than the state of charge of the energy module 110, the controller 116 generates the second control signal 122. Further, the generated second control signal 122 is transmitted to the bi-directional driver 112 to activate the second leg 216 of switches 218 and the third leg 220 of switches 222 in the bi-directional driver 112. As a result, the second number of turns 226 of the transceiver coil 128 is activated or turned ON to receive the first AC signal 130 having a first frequency or a second AC signal 132 having a second frequency from the second external device 108. Further, the controller 116 may transmit one or more frequency control signals to the second leg 216 of switches 218 and the third leg 220 of switches 222 to convert the first AC signal 130 or the second AC signal 132 into a corresponding DC signal that is used for charging the energy module 110 in the wireless power transceiver device 102.

Furthermore, the first AC signal 130 or the second AC signal 132 is received from the second external device 108 until the charge in the energy module 110 of the wireless power transceiver device 102 is greater than the threshold charge value. In particular, the controller 116 transmits the one or more first parameters that indicate the state of charge in the energy module 110 continuously or periodically to the second external device 108. Further, the second external device 108 stops the transmission of the first AC signal 130 or the second AC signal 132 to the wireless power transceiver device 102 if the charge in the energy module 110 of the wireless power transceiver device 102 is greater than the threshold charge value. In another embodiment, if the second external device 108 is compatible with both first and second frequency standards, the bi-directional driver 112 may receive the first AC signal 130 having the first frequency and the second AC signal 132 having the second frequency from the second external device 108. Further, the bi-directional driver 112 may convert the first AC signal 130 having the first frequency and the second AC signal 132 having the second frequency to the DC signal 134 that is used for charging the energy module 110.

Figure 3:
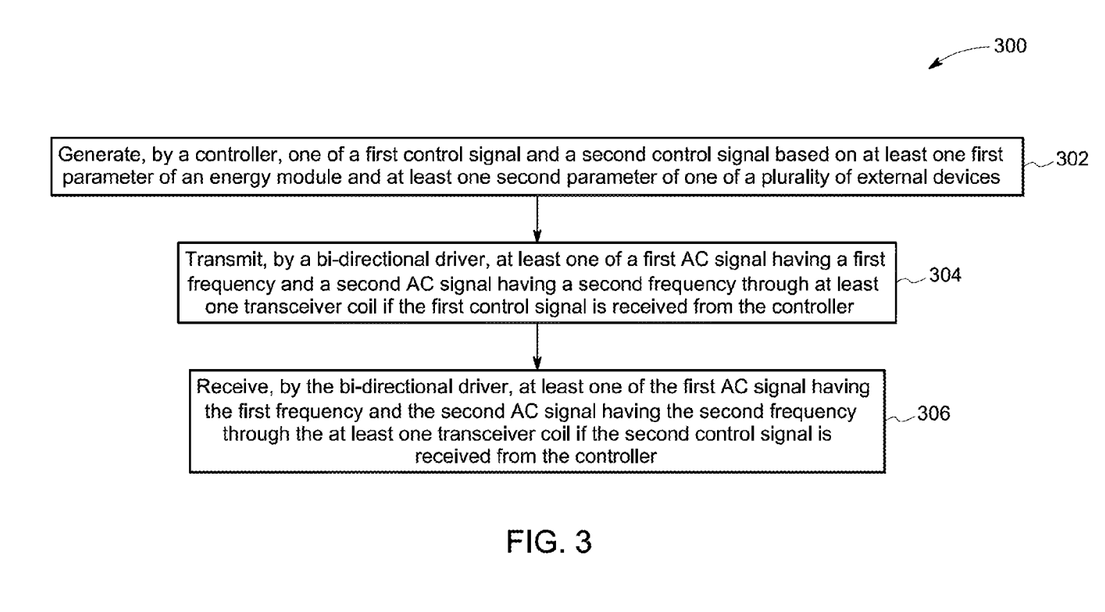
FIG. 3 is a flow chart illustrating a method for transmitting and receiving power from external devices in accordance with embodiments of the present invention.

Referring to FIG. 3, a method 300 for transmitting and receiving power from external devices in accordance with embodiments of the present invention, is depicted. For ease of understanding, the method 300 is described with reference to the embodiments of FIGS. 1 and 2. At step 302, a controller of a wireless power transceiver device generates one of a first control signal and a second control signal. Particularly, the controller receives at least one parameter from the energy module and at least one parameter from the external device. Further, the controller generates the first control signal or the second control signal based on the at least one parameter of the energy module and the external device.

Subsequently, at step 304, at least one of a first AC signal having a first frequency and a second AC signal having a second frequency that is different from the first frequency are transmitted through at least one transceiver coil if the first control signal is received from the controller. The bi-directional driver is configured to receive the first control signal from the controller. Further, in response to receiving the first control signal, a first leg of switches and a third leg of switches are activated to turn ON a first number of turns of the transceiver coil. Further, the first leg of switches and the third leg of switches receive one or more frequency control signals from the controller to convert the DC signal received from the energy module to at least one of the first AC signal having the first frequency and the second AC signal having the second frequency. Thereafter, the at least one of the first AC signal having the first frequency and the second AC signal having the second frequency are transmitted to the external device to charge one or more loads, such as batteries in the external devices.

In addition, at step 306, at least one of the first AC signal having the first frequency and the second AC signal having the second frequency are received through the at least one transceiver coil if the second control signal is received from the controller. The bi-directional driver is configured to receive the second control signal from the controller. Further, in response to receiving the second control signal, a second leg of switches and the third leg of switches are activated to turn ON a second number of turns of the transceiver coil. Further, the second leg of switches and the third leg of switches receive one or more frequency control signals from the controller to convert the at least one of the first AC signal having the first frequency and the second AC signal having the second frequency that are received from the transceiver coil to a DC signal. Thereafter, the converted DC signal is used to charge the energy module of the wireless power transceiver device.

In accordance with the exemplary embodiments discussed herein, the exemplary system and method facilitate to transmit and receive power from external devices. In particular, the system and method disclosed herein allow devices, such as power banks or mobile devices to receive power from other external devices or transfer the power wirelessly to charge other external devices independent of wireless charging standards.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A wireless power transceiver device, comprising:
an energy module;
a magnetic interfacing unit comprising at least one transceiver coil;
a controller coupled to the magnetic interfacing unit, and configured to:
receive a first parameter indicating a state of an external device,
determine, based at least in part on the first parameter, whether the external device is a power receiving device or a power transmitting device, and
generate one of a first control signal or a second control signal to control a bi-directional driver based, at least in part, on whether the external device is the power receiving device or the power transmitting device, and
provide the first control signal or the second control signal to the bi-directional driver; and
the bi-directional driver coupled to the magnetic interfacing unit and the controller, wherein the bi-directional driver includes a plurality of switches, the bi-directional driver configured to:
control a direction of power transfer between the external device and the energy module through the bi-directional driver based on a state of the plurality of switches associated with the first control signal and the second control signal,
obtain energy from the energy module and output an outgoing AC signal through the at least one transceiver coil when the controller generates the first control signal, and
receive an incoming AC signal through the at least one transceiver coil and output energy to the energy module when the controller generates the second control signal.

2. The wireless power transceiver device of claim 1, wherein the energy module is coupled to the controller and the bi-directional driver, and wherein the energy module is configured to:
transmit a DC signal to the bi-directional driver when the controller generates the first control signal; and receive the DC signal from the bi-directional driver when the controller generates the second control signal.

3. The wireless power transceiver device of claim 1, wherein the controller is configured to:
receive a second parameter from the energy module;
wherein to determine whether the external device is the power receiving device or the power transmitting device includes to determine, based at least in part on the second parameter, whether the external device is the power receiving device or the power transmitting device.

4. The wireless power transceiver device of claim 3, wherein the second parameter comprises at least one member selected from a group consisting of a state of charge of the energy module, power of the energy module, voltage of the energy module, and frequency band type of the wireless power transceiver device.

5. The wireless power transceiver device of claim 1, wherein the plurality of switches includes a first leg of switches and a second leg of switches, wherein the bi-directional driver comprises a bridge circuit comprising the first leg of switches and the second leg of switches.

6. The wireless power transceiver device of claim 5, wherein the plurality of switches includes a third leg of switches coupled in parallel to the first leg of switches and the second leg of switches, wherein the third leg of switches is configured to tap the at least one transceiver coil at a predefined location to vary a number of turns of the at least one transceiver coil.

7. The wireless power transceiver device of claim 6, wherein the bi-directional driver is configured to:
control the first leg of switches and the third leg of switches to drive a first number of turns of the at least one transceiver coil to transmit the outgoing AC signal to the external device when the first control signal is received from the controller.

8. The wireless power transceiver device of claim 7, wherein the bi-directional driver is configured to:
control the second leg of switches and the third leg of switches to drive a second number of turns of the at least one transceiver coil to receive the incoming AC signal from the external device when the second control signal is received from the controller, wherein the second number of turns is different from the first number of turns.

9. The wireless power transceiver device of claim 1, wherein the bi-directional driver is configured to:
receive a DC signal of an input power from the energy module when the first control signal is received from the controller;
convert the DC signal to at least one of a first AC signal having a first frequency or a second AC signal having a second frequency; and
transmit at least one of the first AC signal having the first frequency or the second AC signal having the second frequency to the external device through the at least one transceiver coil.

10. The wireless power transceiver device of claim 1, wherein the bi-directional driver is configured to:
receive one of a first AC signal having a first frequency or a second AC signal having a second frequency from the external device through the at least one transceiver coil when the second control signal is received from the controller;
convert one of the first AC signal or the second AC signal to a DC signal; and
charge the energy module using the DC signal.

11. The wireless power transceiver device of claim 1, wherein the at least one transceiver coil is magnetically coupled to at least one coil of the external device.

12. The wireless power transceiver device of claim 1, wherein:
the first parameter comprises at least one member selected from a group consisting of a second state of charge of the external device, power of the external device, voltage of the external device, and frequency band type of the external device.

13. A method comprising:
receiving, by a controller, at least a first parameter indicating a state of an external device;
determining, based at least in part on the first parameter, whether the external device is a power receiving device or a power transmitting device;
generating, by the controller, one of a first control signal or a second control signal based on whether the external device is the power receiving device or the power transmitting device;
providing the first control signal or the second control signal to a bi-directional driver, the bi-directional drive including a plurality of switches; and
controlling a direction of power transfer between the external device and an energy module through the bi-directional driver based on a state of the plurality of switches associated with the first control signal and the second control signal, wherein the controlling includes:
activating a first subset of the plurality of switches and transmitting, by the bi-directional driver, an outgoing AC signal through at least one transceiver coil when the controller generates the first control signal; and
activating a second subset of the plurality of switches and receiving, by the bi-directional driver, an incoming AC signal through the at least one transceiver coil when the controller generates the second control signal.

14. The method of claim 13, wherein the plurality of switches includes a first leg of switches, a second leg of switches, and a third leg of switches, wherein the bi-directional driver comprises a bridge circuit comprising the first leg of switches and the second leg of switches, and wherein the third leg of switches is connected in parallel with the bridge circuit.

15. The method of claim 14, further comprising:
controlling the first leg of switches and the third leg of switches of the bi-directional driver to drive a first number of turns of the at least one transceiver coil to transmit the outgoing AC signal to the external device when the controller generates the first control signal.

16. The method of claim 15, further comprising controlling the second leg of switches and the third leg of switches of the bi-directional driver to drive a second number of turns of the at least one transceiver coil to receive the incoming AC signal from the external device when the controller generates the second control signal, wherein the second number of turns is different from the first number of turns.

17. The method of claim 13, further comprising:
receiving, by the bi-directional driver, a DC signal of an input power from the energy module when the controller generates the first control signal;
converting the DC signal to at least one of a first AC signal having a first frequency or a second AC signal having a second frequency; and transmitting at least one of the first AC signal having the first frequency or the second AC signal having the second frequency to the external device through the at least one transceiver coil.

18. The method of claim 13, further comprising:
receiving, by the bi-directional driver, at least one of a first AC signal having a first frequency or a second AC signal having a second frequency from the external device through the at least one transceiver coil when the controller generates the second control signal;
converting at least one of the first AC signal or the second AC signal to a DC signal; and
charging the energy module using the DC signal.

19. The method of claim 13, further comprising:
receiving, by the controller, a second parameter from the energy module, the second parameter representing a second state of charge of the energy module, wherein the first parameter indicates a first state of charge of the external device;
wherein said generating one of the first control signal or the second control signal includes:
generating the first control signal when the first parameter indicating the first state of charge of the external device is less than the first second parameter indicating the second state of charge of the energy module.

20. The method of claim 19, wherein said generating one of the first control signal or the second control signal includes:
generating the second control signal when the first parameter indicating the first state of charge of the external device is greater than the second parameter indicating the second state of charge of the energy module.

* * * * *